(12) United States Patent
Delmas et al.

(10) Patent No.: US 10,889,936 B2
(45) Date of Patent: Jan. 12, 2021

(54) PRESS JACKET AND METHOD FOR THE PRODUCTION THEREOF

(71) Applicant: VOITH PATENT GMBH, Heidenheim (DE)

(72) Inventors: Delphine Delmas, Heidenheim (DE); Hermann Reichert, Heidenheim/Oggenhausen (DE); Uwe Matuschczyk, Geislingen (DE); Michael Wokurek, Vienna (AT)

(73) Assignee: Voith Patent GmbH, Heidenheim (DE)

( * ) Notice: Subject to any disclaimer, the term of this patent is extended or adjusted under 35 U.S.C. 154(b) by 217 days.

(21) Appl. No.: 16/070,799

(22) PCT Filed: Dec. 20, 2016

(86) PCT No.: PCT/EP2016/081882
§ 371 (c)(1),
(2) Date: Jul. 18, 2018

(87) PCT Pub. No.: WO2017/129328
PCT Pub. Date: Aug. 3, 2017

(65) Prior Publication Data
US 2019/0024312 A1 Jan. 24, 2019

(30) Foreign Application Priority Data
Jan. 29, 2016 (DE) .................. 10 2016 201 344

(51) Int. Cl.
*D21F 3/02* (2006.01)
*C08G 18/76* (2006.01)
(Continued)

(52) U.S. Cl.
CPC .......... *D21F 3/0236* (2013.01); *C08G 18/10* (2013.01); *C08G 18/227* (2013.01);
(Continued)

(58) Field of Classification Search
CPC ........ D21F 3/02; D21F 3/0209; D21F 3/0218; D21F 3/0227; D21F 3/0236; D21F 7/086; D21G 1/006
(Continued)

(56) References Cited

U.S. PATENT DOCUMENTS 6,239,209 B1   5/2001  Yang et al.
6,921,461 B2 * 7/2005  Watanabe ............. D21F 3/0227
                                                        162/358.4
(Continued)

FOREIGN PATENT DOCUMENTS

DE   102004046508 A1   3/2006
DE   102013222458 A1   5/2015
(Continued)

*Primary Examiner* — Eric Hug
(74) *Attorney, Agent, or Firm* — Laurence A. Greenberg; Werner H. Sterner; Ralph E. Locher

(57) ABSTRACT

The invention relates to a press jacket comprising at least one polymer layer, where the polymer layer comprises, or has been produced from, a polyurethane, where the polyurethane has been formed from a prepolymer and a crosslinking agent, and the prepolymer is a reaction product of phenylene 1,4-diisocyanate and of a polyol, where the crosslinking agent comprises the following components:
a first component comprising 1,4-butanediol or 1,4-hydroquinone bis(2-hydroxyethyl) ether (HQEE),
a second component comprising at least one aliphatic diamine,
a third component comprising at least one alkanolamine.

20 Claims, 2 Drawing Sheets

(51) Int. Cl.
  *C08G 18/10* (2006.01)
  *C08G 18/22* (2006.01)
  *C08G 18/32* (2006.01)

(52) U.S. Cl.
  CPC ....... *C08G 18/7614* (2013.01); *D21F 3/0227* (2013.01); *C08G 18/3215* (2013.01); *C08G 18/3228* (2013.01); *C08G 18/3271* (2013.01)

(58) Field of Classification Search
  USPC .............................................. 162/358.4, 901
  See application file for complete search history.

(56) References Cited

U.S. PATENT DOCUMENTS

| | | | | |
|---|---|---|---|---|
| 7,736,468 | B2* | 6/2010 | Li | D21F 3/0227 162/358.4 |
| 7,947,154 | B2* | 5/2011 | Yazaki | C08G 18/10 162/358.4 |
| 8,025,771 | B2* | 9/2011 | Ouchi | D21F 7/083 162/358.2 |
| 8,303,776 | B2* | 11/2012 | Lahdensuo | D21F 3/0227 162/358.4 |
| 8,647,475 | B2* | 2/2014 | Turunen | D21F 3/08 156/169 |
| 9,096,707 | B2* | 8/2015 | Singh | C08G 18/324 |
| 9,777,433 | B2* | 10/2017 | Takamori | D21F 3/029 |
| 10,384,428 | B2* | 8/2019 | Xu | B32B 5/02 |
| 2006/0093844 | A1 | 5/2006 | Conklin et al. | |
| 2007/0004895 | A1 | 1/2007 | Elsbernd et al. | |
| 2007/0270543 | A1 | 11/2007 | Wagner et al. | |
| 2015/0308044 | A1* | 10/2015 | Delmas | C08G 18/4854 525/455 |
| 2020/0165777 | A1* | 5/2020 | Delmas | D21F 3/0236 |

FOREIGN PATENT DOCUMENTS

| | | |
|---|---|---|
| WO | 2007089142 A1 | 8/2007 |
| WO | 2015086555 A1 | 6/2015 |

* cited by examiner

PRESS JACKET AND METHOD FOR THE PRODUCTION THEREOF

BACKGROUND OF THE INVENTION

Field of the Invention

The invention is based on a press jacket, in particular for a press device for the treatment of a web of fibrous material, e.g. for smoothing or dewatering same, and also on a corresponding process for the production of said press jacket, details being as in the independent claims.

Press devices such as shoe presses have long been a constituent of modern papermaking machines. In essence, they comprise a non-rotating shoe, which extends in a transverse direction of the machine, and a press jacket rotating around the stationary shoe. The latter is deformable and during operation assumes in essence a tubular shape. The shape of the shoe is such that, with a counter roll, it forms a press nip. The press nip is defined via the contact area of the counter roll in the shoe. The shoe is configured to be movable and can be moved in relation to the counter roll.

The press jacket is subject to very stringent requirements in respect of its stability, namely in respect of surface hardness and resistance to pressure, heat and hydrolysis. The press jacket is moreover subjected to severe cyclical flexural stresses during operation. At the ingoing area at the edge of the shoe—before the press nip in the direction of rotation of the press jacket—bending initially takes place with a relatively small radius. During passage through the press nip, this immediately changes to bending in the opposite sense. At the outgoing area at the other edge of the shoe—i.e. after the press nip in the direction of rotation of the press jacket—bending in the opposite sense again takes place. Another expression used for this deformation at the ingoing and outgoing areas is nip cycle. It can easily be seen that particularly at this location the press jacket is very susceptible to fracture as a consequence of high mechanical stress. Accordingly, the prior art discloses many measures intended to increase the stability of the press jacket.

The possibilities are in essence of two types: firstly suitable selection of the material, and secondly reinforcement layers embedded into the material of the press jacket or bonded thereto in any other way.

As far as materials are concerned, press jackets increasingly use modern polymers such as polyurethanes. Given a suitable composition, these permit production of press jackets with high flexibility together with high stability.

Polyurethanes known hitherto from the prior art—particularly phenylene-1,4-diisocyanate-based prepolymers and 1,4-butanediol (PPDI-1,4-BDO) or phenylene 1,4-diisocyanate and 1,4-hydroquinone bis(2-hydroxyethyl) ether (PPDI-1,4-HQEE), respectively crosslinked by aromatic polyamines—have, however, hitherto not been able to achieve, in every application, stability and lifetime that are satisfactory for customers.

The present invention relates to articles of this generic type mentioned in the introduction.

SUMMARY OF THE INVENTION

Accordingly, it is an object of the invention to provide a press jacket and a process for production thereof, where said press jacket and said process avoid the disadvantages of the prior art. In particular, the object consists in providing a press jacket which, in comparison with the press jackets known from the prior art, has increased stability and lifetime.

The object is achieved via the features of the independent claims. Particularly preferred and advantageous embodiments of the invention are given in the dependent claims.

The inventors have selected an unusual approach to the improvement of mechanical properties of this type of press jacket. Instead of, as has been conventional thereto, concentrating solely on the externally measurable properties of the polyurethane press jacket, the inventors have considered the relevant factors at molecular level. The invention derived from the knowledge that, at least in elastomeric form, polyurethane comprises hard segments, which form crystalline structures, and unordered soft segments. The hard segments prevent the soft segments from sliding past one another when the material is subjected to tensile strain. The quality of the arrangement of the hard segments here with respect to one another has a decisive effect on the mechanical properties of the polyurethane. The inventors have discovered that in a polyurethane by way of example based on PPDI and 1,4-BDO increasing 1,4-BDO content permits achievement of a better arrangement of the hard segments. With the aim of increasing 1,4-BDO content, the inventors' first approach was to add aliphatic amines to the cross linking agent. By virtue of the higher basicity of these in comparison with aromatic amines, it was possible to reduce the content of amines in comparison with the 1,4-BDO. Initial experiments revealed that this measure was not sufficient in itself to achieve satisfactory stability of this type of press jacket. The solution was found only after discovering that a portion of the amines used in the crosslinking agent could be replaced by molecules which bear hydroxy groups and which are not classified as polyamines, examples being alkanolamines, e.g. monoethanolamines. The reason is that this measure provides more hydroxy groups, while reactivity is unchanged. The hard segments approach one another more closely, and this finally leads to the superior mechanical properties of a polyurethane of the invention. Surprisingly, it has been found that during the casting of the polymer it is possible to produce monolithic layers that are thicker than in the prior art. Similarly good results were achieved correspondingly with phenylene 1,4-diisocyanate and 1,4-hydroquinone bis(2-hydroxyethyl) ether (PPDI-1,4-HQEE).

For the purposes of the invention, the expression press device means by way of example a shoe press, for example for the dewatering or treatment, for example calendering, of a web of fibrous material. The shoe press comprises a shoe press roll and a counter roll, which together form or delimit a press nip. The shoe press roll moreover comprises a rotating press jacket and a stationary press element, known as the press shoe. The latter rests on a supportive cradle—by way of example via hydraulic press elements—and is pressed onto the rotating press jacket. The press jacket is thus pressed against the counter roll in the press nip. The term non-rotating means that the press element does not rotate relative to the shoe press roll or the counter roll, but is capable of displacement—toward and away from the counter roll, preferably in the radial direction thereof—and therefore relative to the counter roll. Materials that can be passed through the press nip of the shoe press, in addition to the web of fibrous material and the press jacket, are one or more press felts continuously rotating in circumferential direction and/or other continuously rotating press belts. This type of shoe press can of course comprise more than one press nip.

For the purposes of the invention, a web of fibrous material is a laid scrim or unstructured assemblage composed of fibers, for example wood fibers, synthetic fibers, glass fibers, carbon fibers, adjuvants, additives or the like. The web of fibrous material can therefore be configured by way of example as paper web, paperboard web or tissue web. It can in essence comprise wood fibers, and adjuvants and additives, or else small quantities of other fibers, can be present here. This remains a matter for the person skilled in the art to consider in accordance with the application.

For the purposes of the invention, a press jacket is a belt or jacket which, as described, is passed together with a web of fibrous material through the press nip of a shoe press. For the dewatering of the web of fibrous material, it is possible that during correct operation the radially outermost surface (polymer layer) of the press jacket comes into contact with a press felt which directly supports the web of fibrous material to be dewatered. In some embodiments of the press equipment, it is also possible that, in correct operation, the press jacket comes directly into contact with the web of fibrous material, for example for the calendering of same. The press jacket here is configured as a jacket that is continuous and coherent in circumferential direction around the longitudinal axis of same. It is open at its axial ends—in width direction (along the longitudinal axis). It is therefore possible that at these axial ends the press jacket is held by two lateral tensioning plates in order to form the shoe press roll. Another possibility, instead of guidance via the two lateral tensioning plates, is that, as is the case in open shoe presses, guidance of the press jacket is achieved by way of the press shoe and a plurality of guide rolls. There can be grooves and/or blind holes provided to the surface of this type of press jacket, i.e. by way of example to the radially outermost polymer layer of same.

The press jacket can have been produced to some extent or entirely from a polymer. A pourable, hardenable, preferably elastomeric polymer such as polyurethane can be used as polymer here. The polymer can therefore have been formulated as pourable elastomer.

The expression polymer layer means a layer that comprises, or has entirely been produced from, this type of pourable, hardenable, preferably elastomeric polymer. The polymer layer can preferably be a monolithic hardened layer produced by molding. In other words, said layer is monolithically molded, i.e. produced by, for example, casting. The term monolithic also includes cases where, during casting of the polymer, the single layer has in turn been produced from a plurality of sub layers of identical material. However, this is true only insofar as after hardening these sub layers are in essence no longer visible, but instead the result is a single, preferably uniform layer. This also applies correspondingly to the finished press jacket.

When there are a plurality of polymer layers provided, these can be in a mutually superposed arrangement in radial direction. The number of polymer layers provided is preferably precisely one, two or three. These can be identically configured in respect of their polymer, or vary in respect of their hardness or stoichiometry. The total thickness of the finished press jacket in a section through the longitudinal axis of same measured in radial direction can be from 5 to 10 mm, preferably from 5 to 7 mm, particularly preferably from 5 to 6 mm. According to the invention, in the case of provision of a single layer, the press jacket can have been produced from just one casting procedure, i.e. monolithically, in a manner such that the single layer has the thickness mentioned immediately above.

For the purposes of the invention, a finished press jacket is a jacket of which at least one polymer layer has been hardened and subjected to finishing operations, i.e. is ready for use for the purpose mentioned in the introduction in, for example, a shoe press. Analogously, the expression finished polymer layer means a layer that has been hardened.

It is in principle conceivable that the press jacket comprises a reinforcement structure. For the purposes of the invention, the expression reinforcement structure means reinforcement of the at least one layer comprising the polymer or consisting of same—i.e. of the polymer layer. It is possible here that the reinforcement structure has been entirely embedded into the polymer layer in a manner such that the reinforcement structure does not protrude beyond the boundary of the polymer layer. In other words, the polymer layer assumes the role of a matrix which surrounds the reinforcement structure and, as a consequence of forces of adhesion or of cohesion, binds the reinforcement structure to the matrix. This reinforcement structure can comprise reinforcement structures such as linear textile elements—e.g. yarns or cords—and/or textile sheets—for example woven fabrics, knitted fabrics, braided fabrics or laid scrims—and can have been produced from a corresponding starting material, e.g. via winding. The expression starting material means any material or semifinished product by means of which the reinforcement structure of the finished press jacket of the invention is produced. This reinforcement structure can be embedded into the polymer layer in or after the step e) in the process of the invention.

When for the purposes of the invention it is stated that the crosslinking agent comprises at least three components, this means embodiments comprising precisely three, precisely four or precisely five or more than five components. The crosslinking agent in the invention is intended to have been produced from at least three components, namely: the first component made of 1,4-butanediol or 1,4-hydroquinone bis(2-hydroxyethyl) ether (or a mixture of both of these), the second component made of at least one aliphatic diamine and the third component made of at least one alkanolamine. The percentage proportions of the three, four, five or more components can, of course, have been selected in a manner such that precisely three, four, five or more components are present. The percentage proportions of each of the at least three components can be selected in a manner such that their entirety does not exceed 100 mol %.

It would alternatively in principle be conceivable that, in addition to the three components mentioned immediately above, a fourth component (K4) which comprises, or is formed from, a catalyst is also added thereto.

It would also optionally be possible that the crosslinking agent also comprises, in addition to the four components mentioned immediately above, a further, fifth component (K5). In this case, therefore, the crosslinking agent would consist of precisely five components. This fifth component could be a polyol, preferably a long-chain polyol. It could be selected from polyester polyol, in particular polycaprolactone polyol; polyether polyols, in particular polytetramethylene ether glycol (PTMEG), polypropylene glycol (PPG), polyethylene glycol (PEG) and polyhexamethylene ether glycol; polycarbonate polyol, polyether carbonate polyol, polybutadiene polyol, perfluoropolyether polyol, silicone polyol and mixtures thereof. Provision of a polyol in the crosslinking agent provides the advantage that the hardness of the finished press jacket can be reduced.

The statements made above relating to precisely three components are also applicable analogously here: the percentage proportions of each of the precisely four or precisely five components can be selected in a manner such that their entirety does not exceed 100 mol %. In other words, this means that specifically precisely three or precisely four or precisely five components are present in the crosslinking agent.

The reaction rate can be controlled more effectively by means of a catalyst admixed with the cross linking agent. However, this is not essential. It would therefore be in principle conceivable to omit component K4, i.e. the catalyst. If a further ("fifth") component K5 were to have been provided, the crosslinking agent would then comprise precisely four components, namely the first K1, the second K2, the third K3 and the further component K5. The statements made above apply analogously in respect of the components mentioned.

Irrespective of the alternatives mentioned, i.e. for example whether the cross linking agent has been produced from, or comprises, precisely three, precisely four or precisely five or more components, each of the components mentioned could in turn consist of further subcomponents. However, it is preferable that the substances of the invention themselves are the components.

When the phrase "at least" one component of the crosslinking agent is used in the invention, this then means either precisely one or more than one of these, i.e. a plurality of corresponding components.

It is possible in the process of the invention by way of example that the components of the invention are added to the crosslinking agent before they are reacted with the prepolymer.

The expression "at most" in relation to the defined percentage of a component means that the proportion is at least >0%, i.e., for example, 0.01% or more, but no more than the defined percentage. If by way of example the expression "at most 15%" is used, this always means the range between >0%, i.e. for example more than 0.01%, and 15%. In every case, therefore, all of the three, four, five or more components of the invention are always represented, and individually represented in the cross linking agent.

For the purposes of the invention, when the expression aliphatic amines is used, this can then mean primary aliphatic amines (R—$NH_2$), secondary aliphatic amines ($R_2$—NH) or tertiary aliphatic amines $R_3N$. However, in a preferred embodiment, the aliphatic amines are primary aliphatic amines, because with these the advantages of the invention can most effectively be achieved.

For the purposes of the invention, alkanolamines, also termed amino alcohols, are a group of organic compounds that simultaneously comprise at least two functional groups, comprising a hydroxy group and an amino group. In one embodiment, preference is given to alkanolamines having a primary (—$NH_2$) or secondary (—NHR) amino function. The alkanolamine is preferably a monoethanolamine. Compliance with the advantages of the invention is thus particularly effectively achieved.

Studies have revealed that very effective compliance with the advantages of the invention is already also achieved when the polyol of the prepolymer is (exclusively) a mixture of polytetramethylene ether glycol (PTMEG) and polycarbonate polyol or polyether carbonate polyol—(PPDI-PTMEG-PC)—and the at least three components K1 to K3 of the crosslinking agent are present.

The proportion provided of the PTMEG of the prepolymer here can be from 0.01 mol % to 54 mol %, preferably from 44 mol % to 54 mol %. This permits even more effective realization of the advantages of the invention.

It has been found that a press jacket exhibits the advantages of the invention to the greatest extent when its composition is as follows:
- the first component is 1,4-BDO or 1,4-hydroquinone bis(2-hydroxyethyl) ether (HQEE),
- the second component, i.e. the aliphatic diamine, is hexamethylenediamine (HMDA),
- the third component, i.e. the alkanolamine, is monoethanolamine,
- the fourth component, i.e. the catalyst, comprises bismuth, an example being bismuth neodecanoate.

The invention also provides a press roll, for example a shoe press roll, for a shoe press for the dewatering of a web of fibrous material, where the press roll has at least one press jacket of the invention.

The invention also provides a shoe press for the dewatering of a web of fibrous material, preferably a paper web, paperboard web, tissue web or pulp web, comprising a press roll and a counter roll, which together form, or delimit, a nip, where the press roll comprises a rotating press jacket, where the press jacket is configured as in the invention.

Finally, the invention provides the use of a press jacket of the invention for a press, for example shoe press for the dewatering of a web of fibrous material, preferably a paper web, paperboard web, tissue web or pulp web.

BRIEF DESCRIPTION OF THE SEVERAL VIEWS OF THE DRAWING

The invention is explained in more detail below with reference to the drawings, with no restriction of generality. The drawings show.

DESCRIPTION OF THE INVENTION

Figure 1:
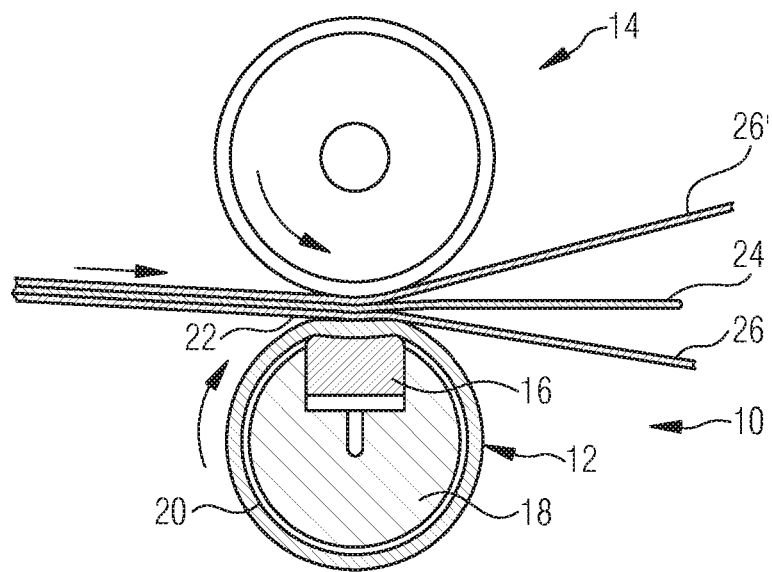
in FIG. 1, a diagrammatic side view, in section, of a shoe press with a press jacket as in an embodiment of the present invention.

FIG. 1 depicts a shoe press 10, which here comprises a press roll of the invention, for example shoe press roll 12, and a counter roll 14. Shoe press roll 12 and counter roll 14 are arranged parallel to one another in respect of their longitudinal axes. Together, they form, or delimit, a nip 22.

Whereas the counter roll 14 here consists of a cylindrical roll rotating around its longitudinal axis, the shoe press roll 12 is composed of a shoe 16, a non-rotating cradle 18 supporting same, and a press jacket 20. In relation to the counter roll 14 and the press jacket 20, the arrangement of shoe 16 and cradle 18 is non-rotating. The shoe 16 here is supported by the cradle 18 and, by way of hydraulic press elements not depicted, is pressed onto the press jacket 20, which rotates relatively thereto. The press jacket 20, which surrounds shoe 16 and cradle 18 in circumferential direction, rotates here around its longitudinal axis in the direction of rotation opposite to that of the counter roll 14. The concave shape of the shoe 16 on its side facing toward the counter roll 14 provides a comparatively long nip 22.

The shoe press 10 is in particular suitable for the dewatering of webs 24 of fibrous material. During the operation of the shoe press, a web 24 of fibrous material is passed with one or two press felts 26, 26' through the press nip 22. In the present case, there are precisely two press felts 26, 26' which enclose the web 24 of fibrous material in the manner of a sandwich. During passage through the nip 22, a pressure is exerted indirectly via the press felts 26, 26' onto the web 24 of fibrous material. This is achieved in that the radially outermost surface of the counter roll 14 on the one hand and the radially outermost surface of the press jacket 20 come into direct contact with the corresponding press felts 26, 26'. The liquid emerging from the web 24 of fibrous material is temporarily absorbed by the press felts 26, 26' and any depressions (not depicted) possibly provided in the press jacket surface. After passage through the nip 22, the liquid absorbed by the depressions of the press jacket 20 is removed by centrifugal force before the press jacket 20 re-enters the press nip 22. Suction elements can also be used to remove the water absorbed by the press felt 26, 26' after passage through the press nip 22.

Figure 2:
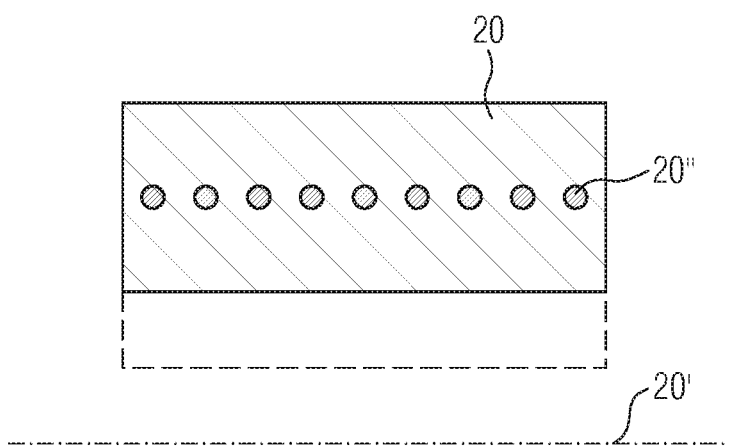
in FIG. 2, an enlarged diagram, in section, of an embodiment of a press jacket in a cross section through the longitudinal axis thereof.

FIG. 2 shows a possible embodiment of the invention in a not-to-scale partial cross section along the longitudinal axis 20' of the finished press jacket 20. The (precisely) one polymer layer of the press jacket 20 can be seen. As indicated by the broken lines, it would be conceivable that the press jacket 20 consists of a plurality of polymer layers in a radially mutually superposed arrangement. By way of example, it would be conceivable that there are precisely two polymer layers, a radially interior polymer layer (depicted by broken lines) and a radially outermost polymer layer (depicted in continuous lines).

There is a reinforcement structure 20" embedded here into the at least one polymer layer. This is indicated by the shaded circles, which can be textile sheets or linear textile elements, for example fibers. The reinforcement structure has been embedded entirely into the polymer layer, i.e. the reinforcement structure does not extend beyond the boundaries of the polymer layer.

Figure 3:
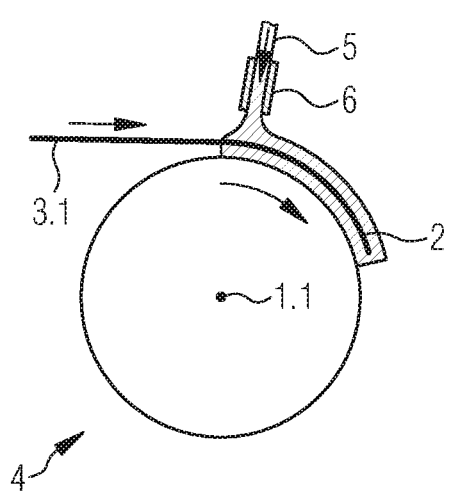
in FIG. 3, a diagram of the conduct of the process of the invention in a side view of a device for the production of the press jacket.

FIG. 3 is a diagrammatic side view of a device for the production of a press jacket 20 of the invention. The device is configured in a manner such that it implements the process of the invention for the production of press jacket 20. The device here has precisely one cylindrical winding mandrel 4, and by way of example a starting material 3.1 is applied in the form of a spiral here onto the radially outermost curved surface thereof. The depiction shows an initial phase of the production process. In the present case, for the stated purpose, one of the ends of the starting material 3.1 has been secured on a polymer arranged on the external circumference of the winding mandrel 4. Other than in the diagram shown, the end of the starting material 3.1 could also be directly in contact with, or applied, on the winding mandrel 4 with no polymer provided initially between starting material 3.1 and winding mandrel 4. The starting material 3.1 here can be a textile sheet or linear elements.

The winding mandrel 4 is mounted rotatably around its longitudinal axis 1.1, which corresponds to the longitudinal axis of the press jacket to be produced. The longitudinal axis 1.1 here runs perpendicularly into the plane of the drawing. By way of a line 5, a pourable material, for example pourable, hardenable elastomeric polymer, e.g. polyurethane, is applied from above through a casting nozzle 6 onto the radially outermost curved surface of the winding mandrel 4 or onto the starting material 3.1. This type of pourable material can by way of example be selected in respect of its pot life and viscosity in a manner such that during the casting process it does not drip from the winding mandrel 4. During the above, the winding mandrel 4 is rotated in the direction of the arrow around its longitudinal axis. Simultaneously with this rotation, the casting nozzle 6 is conducted, by way of a suitable guidance system which is parallel to the longitudinal axis 1.1 but not depicted in any detail in FIG. 3, along said guiding system relative to the winding mandrel 4. Simultaneously with the application of the pourable material, the starting material 3.1 is unrolled and wound onto the rotating winding mandrel 4, to give spirals. The pourable material can pass through the starting material 3.1 here as far as the winding mandrel 4. After the hardening step in this example, the polymer forms a first, radially innermost and preferably elastomeric, polymer layer 2 of the press jacket, only a portion of this being shown in FIG. 3.

The pourable material emerging from the casting nozzle 6 is a mixture of a reaction product (also termed prepolymer) and a crosslinking agent. The former is provided from a reaction product container not shown in which it is stored or mixed. The reaction product can by way of example comprise phenylene 1,4-diisocyanate (PPDI) and a polyol. In the reaction product container (prepolymer container) it can by way of example take the form of a prepolymer made of the substances mentioned immediately above.

The crosslinking agent can be provided in a crosslinking agent container. The crosslinking agent comprises at least one first component K1, for example comprising 1,4-butanediol (BDO), a second component K2 comprising at least one aliphatic diamine, and also a third component K3 comprising at least one alkanolamine. However, it can also comprise fourth or fifth or further components. The crosslinking agent with its corresponding components can be mixed directly in the crosslinking agent container. However, it is also conceivable that the device comprises a corresponding individual container for each of the components, connected by way of flow lines not shown to the crosslinking agent container, in order to produce the crosslinking agent of the invention in the crosslinking agent container.

Reaction product container and crosslinking agent container are assigned to the device for the production of a press jacket 20. They have connection by way of flow lines likewise not shown to a mixing chamber (not shown) which is upstream of the casting nozzle 6 in the direction of flow. The reaction product-crosslinking-agent mixture is therefore mixed upstream and outside of the casting nozzle 6, i.e. in the mixing chamber. Independently of the production of the mixture, this is then applied to the surface of the winding mandrel 4 for the formation of the at least one polymer layer 2 of the press jacket 20.

By means of this continuous casting procedure, therefore, a continuous press jacket 20, which is coherent and cylindrical around its longitudinal axis 1.1, and the internal circumference of which in essence corresponds to the external circumference of the winding mandrel 4, is progressively produced across the width of the winding mandrel 4.

It would in principle be conceivable to wind the starting material 3.1 onto more than the single winding mandrel 4 shown in FIG. 3. By way of example, there could be two winding mandrels provided which could be in parallel arrangement in respect of their longitudinal axes at a distance from one another. Alternatively, it would also be conceivable that the polymer is also applied to the radially interior curved surface of the winding mandrel 4, e.g. by a method using centrifugal force.

Independently of the embodiment addressed, the finished press jacket 20 is finally removed from the at least one winding mandrel 4.

As depicted in the figures, the press jacket 20 is configured in accordance with the invention. This means that the polymer layer has (to some extent or entirely) been produced from a polyurethane. The polyurethane here has been formed from a prepolymer which is a reaction product of PPDI and of a polyol, and from a crosslinking agent. The crosslinking agent comprises the components mentioned in the introduction. These guarantee the particularly high stability in respect of the mechanical properties of the press jacket 20, and lead to a prolonged lifetime of same during operation.

What is claimed is:

1. A press jacket comprising:
   at least one polymer layer including or being produced from a polyurethane, said polyurethane being formed from a prepolymer and a cross linking agent,
   wherein said prepolymer is a reaction product of phenylene 1,4-diisocyanate (PPDI) and a polyol selected from the group consisting of polyester polyol, polycaprolactone polyol, polyether polyol, polytetramethylene ether glycol (PTMEG), polypropylene glycol (PPG), polyethylene glycol (PEG), polyhexamethylene ether glycol, polycarbonate polyol, polyether carbonate polyol, polybutadiene polyol, and mixtures thereof, and
   wherein said cross linking agent comprises:
      a first component comprising 1,4-butanediol (BDO) or 1,4-hydroquinone bis(2-hydroxyethyl) ether (HQEE),
      a second component comprising at least one aliphatic diamine selected from the group consisting of ethylenediamine (EDA), 2,2,4-trimethyl-1,6-hexanediamine, 2,4,4-trimethyl-1,6-hexanediamine, hexamethylenediamine (HMDA), and mixtures thereof, and
      a third component comprising monoethanolamine.

2. The press jacket according to claim 1, wherein said cross linking agent includes from 60 mol % to 99.9 mol % of said first component.

3. The press jacket according to claim 1, wherein said cross linking agent includes from 75 mol % to 99.9 mol %, of said first component.

4. The press jacket according to claim 1, wherein said crosslinking agent includes at most 15 mol % of said second component.

5. The press jacket according to claim 1, wherein said cross linking agent includes at most 20 mol % of said third component.

6. The press jacket according to claim 1, wherein said cross linking agent has a fourth component including a catalyst, and said fourth component is selected from the group consisting of:
   tertiary amines including 1,4-diazabicyclo[2.2.2]octane (DABCO),
   triethylenediamine (TEDA),
   triethylamine,
   metal compounds,
   organometallic compounds including bismuth, bismuth neodecanoate, mercury, aluminum, zirconium, iron, calcium, sodium, potassium, lead, tin, or titanium, and mixtures thereof.

7. The press jacket according to claim 6, wherein said cross linking agent includes at most 10 mol % of said fourth component.

8. The press jacket according to claim 6, wherein said cross linking agent includes at most 5 mol % of said fourth component.

9. The press jacket according to claim 1, wherein said at least one polymer layer is a radially outermost polymer layer of the press jacket.

10. The press jacket according to claim 1, which further comprises a reinforcement structure embedded into said at least one polymer layer.

11. The press jacket according to claim 1, wherein said cross linking agent includes an additional component selected from the group consisting of:
    polyester polyol or polycaprolactone polyol;
    polyether polyols or polytetramethylene ether glycol (PTMEG),
    polypropylene glycol (PPG),
    polyethylene glycol (PEG),
    polyhexamethylene ether glycol,
    polycarbonate polyol,
    polyether carbonate polyol,
    polybutadiene polyol,
    perfluoropolyether polyol,
    siliconepolyol, and
    mixtures thereof.

12. The press jacket according to claim 1, wherein said polyol of said prepolymer includes polytetramethylene ether glycol (PTMEG) in a proportion of from 0.01 mol % to 54 mol %.

13. The press jacket according to claim 1, wherein said polyol of said prepolymer includes polytetramethylene ether glycol (PTMEG) in a proportion of from 44 mol % to 54 mol %.

14. The press jacket according to claim 12, wherein said polyol of said prepolymer additionally includes a polycarbonate polyol.

15. The press jacket according to claim 1, wherein said polyol of said prepolymer is exclusively a polycarbonate polyol, except for any possible undesired impurities.

16. A press roll or shoe press roll for a shoe press for the treatment of a web of fibrous material, the press roll comprising at least one press jacket according to claim 1.

17. A shoe press for the treatment of a web of fibrous paper, paperboard, tissue or pulp material, the shoe press comprising:
    a press roll and a counter roll together forming or delimiting a nip; and
    said press roll including a surrounding press jacket according to claim 1.

18. A process for the production of a press jacket, the process comprising the following steps:
    a) providing at least one rotatably mounted winding mandrel;
    b) providing a cross linking agent containing at least one first component comprising 1,4-butanediol (BDO) or 1,4-hydroquinone bis(2-hydroxyethyl) ether (HQEE), a second component comprising at least one aliphatic diamine selected from the croup consisting of ethylenediamine (EDA), 2,2,4-trimethyl-1,6-hexanediamine, 2,4,4-trimethyl-1,6-hexanediamine, hexamethylenediamine (HMDA), and mixtures thereof, and a third component comprising monoethanolamine;
    c) providing a reaction product of phenylene 1,4-diisocyanate (PPDI) and a polyol selected from the croup consisting of polyester polyol, polycaprolactone polyol, polyether polyol, polytetramethylene ether glycol (PTMEG), polypropylene glycol (PPG), polyethylene glycol (PEG), polyhexamethylene ether glycol, polycarbonate polyol, polyether carbonate polyol, polybutadiene polyol, and mixtures thereof;
    d) mixing the reaction product and the cross linking agent to produce a polyurethane;

e) spreading a mixture of the reaction-product and the cross linking agent on a surface of the winding mandrel to form at least one polymer layer of the press jacket;

f) hardening the at least one polymer layer; and g) removing the resultant press jacket from the winding mandrel.

19. The process according to claim 18, wherein the reaction product of the phenylene 1,4-diisocyanate (PPDI) and the polyol is a prepolymer.

20. A process for using a press jacket for a press or a shoe press, the process comprising treating a web of fibrous paper, paperboard, tissue or pulp material with the press jacket produced according to claim 18.

* * * * *